United States Patent
Matsubara et al.

(10) Patent No.: US 10,103,394 B2
(45) Date of Patent: Oct. 16, 2018

(54) FUEL CELL SYSTEM PROGRAMMED FOR IMPROVED AIR COMPRESSOR CONTROL

(71) Applicant: TOYOTA JIDOSHA KABUSHIKI KAISHA, Toyota-shi, Aichi-ken (JP)

(72) Inventors: Yasuo Matsubara, Anjo (JP); Kenji Umayahara, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 364 days.

(21) Appl. No.: 14/870,499

(22) Filed: Sep. 30, 2015

(65) Prior Publication Data
US 2016/0111736 A1    Apr. 21, 2016

(30) Foreign Application Priority Data
Oct. 16, 2014    (JP) .................... 2014-211328

(51) Int. Cl.
*H01M 8/04*       (2016.01)
*H01M 8/04119*    (2016.01)
*H01M 8/04492*    (2016.01)
*H01M 8/0438*     (2016.01)
*H01M 8/04746*    (2016.01)

(52) U.S. Cl.
CPC ... *H01M 8/04179* (2013.01); *H01M 8/04395* (2013.01); *H01M 8/04492* (2013.01); *H01M 8/04753* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 2001/0016276 A1 | 8/2001 | Yamanashi | |
| 2012/0070753 A1* | 3/2012 | Nakamura | C01B 3/384 |
| | | | 429/423 |
| 2014/0356746 A1* | 12/2014 | Suzuki | H01M 8/04559 |
| | | | 429/432 |

FOREIGN PATENT DOCUMENTS

| | | |
|---|---|---|
| JP | 2006-040718 A | 2/2006 |
| JP | 2007052937 A | 3/2007 |
| JP | 2007-141475 A | 6/2007 |
| JP | 2008-235203 | 10/2008 |
| JP | 2009301970 A | 12/2009 |

* cited by examiner

*Primary Examiner* — Ula C Ruddock
*Assistant Examiner* — Tony S Chuo
(74) *Attorney, Agent, or Firm* — Dickinson Wright, PLLC

(57) ABSTRACT

A fuel cell system is provided, which includes a fuel cell configured to generate power by a reaction of fuel gas and air, an air compressor configured to compress air and supplying the compressed air to the fuel cell, a controller configured to control operations of the fuel cell and the air compressor, and an exhaust system member configured to discharge off-gas and produced water from the fuel cell. When a first condition including a flow rate of air by the air compressor being greater than a first flow rate is satisfied, the controller increases a rotational speed of the air compressor to supply air at or more than a second flow rate that is greater than the first flow rate to the fuel cell, and to discharge water inside the fuel cell.

7 Claims, 6 Drawing Sheets

FUEL CELL SYSTEM PROGRAMMED FOR IMPROVED AIR COMPRESSOR CONTROL

CROSS REFERENCE TO RELATED APPLICATION

This application claims priority to Japanese Patent Application No. 2014-211328, filed on Oct. 16, 2014, the contents of all of which are incorporated herein by reference in their entirety.

BACKGROUND

The present invention relates to a fuel cell system.

Japanese Patent Publication (JP2008-235203A) discloses a fuel cell system that temporarily reserves water produced by a fuel cell in a tank without letting the water flow out of the system, and uses an air compressor to discharge the reserved produced water at appropriate location and timing.

However, as a flow rate of the air compressor is increased for drain processing, power consumption increases. Therefore, the fuel consumption of the fuel cell increases, and operating noise of the air compressor becomes greater. Although the system disclosed in JP2008-235203A performs the drain processing outdoors without draining indoors, a relation between an operating state and fuel consumption of the fuel cell or a vehicle to which the fuel cell is mounted, and the flow rate of the air compressor is not fully considered.

SUMMARY

The present invention is made in order to solve at least a part of the above described subject, and can be achieved as the following forms.

According to one aspect of the invention, a fuel cell system is provided. The fuel cell system includes a fuel cell configured to generate power by a reaction of fuel gas and air, an air compressor configured to supply air to the fuel cell, a controller configured to control operations of the fuel cell and the air compressor, and an exhaust system member configured to discharge off-gas and produced water from the fuel cell. When a first condition including a flow rate of air supplied to the fuel cell by the air compressor being greater than a first flow rate is satisfied, the controller increases a rotational speed of the air compressor to supply air at or more than a second flow rate that is greater than the first flow rate to the fuel cell, and to discharge water inside the fuel cell. In the fuel cell system according to this aspect, when the air flow rate is greater than the first flow rate, the rotational speed of the air compressor is increased to supply additional air to the fuel cell. Thus, for example, in a case where the air at or more than the second flow rate is supplied to the fuel cell in order to discharge water from the fuel cell, the flow rate of the additional air can be less as the result, as compared with a case where the rotational speed of the air compressor is increased if the air flow rate is not greater than the first flow rate to supply additional air to the fuel cell. As the result, part of fuel consumption that is not directly related to traveling of a vehicle can be less, thereby reducing the fuel consumption.

In the fuel cell system according to this aspect, the controller may estimate a residual quantity of the produced water that is a sum of a quantity of water inside the fuel cell and a quantity of water existing in the exhaust system member. The first condition may further include an estimated value of the residual quantity of the produced water being greater than a first value. When the first condition is satisfied, the controller may increase the rotational speed of the air compressor to supply air at or more than the second flow rate that is greater than the first flow rate to the fuel cell, and to discharge water inside the fuel cell. According to this aspect, since drainage is performed when too much residual produced water is existed, the rotational speed of the air compressor will not be increased when less residual produced water is existed. Thus, the fuel consumption can be less, thereby reducing the fuel consumption.

In the fuel cell system according to this aspect, when a second condition, including the estimated value of the residual quantity of the produced water being greater than the first value, and a demanded power production of the fuel cell being greater than a first power production, is satisfied, the controller may increase the rotational speed of the air compressor to supply air at or more than the second flow rate to the fuel cell, and to discharge water inside the fuel cell, regardless of whether or not the first condition is satisfied. If the demanded power production of the fuel cell is greater than the first power production, the quantity of air required for the power generation is also large. Thus, the additional quantity of air required for discharging water can be less, thereby reducing part of fuel consumption which is not directly related to traveling of the vehicle.

In the fuel cell system according to this aspect, when the estimated value of the residual quantity of the produced water is greater than a second value that is greater than the first value, the controller may increase the rotational speed of the air compressor to supply air at or more than the second flow rate to the fuel cell, and to discharge water inside the fuel cell, regardless of whether or not the first condition is satisfied. If the estimated value of the residual quantity of the produced water is greater than the second value that is greater than the first value, water causes flooding etc., resulting in giving large influence on the power generation. Thus, it is preferred to perform the drain processing in such a case, regardless of whether or not the first condition is satisfied, i.e., without taking the fuel consumption into consideration.

In the fuel cell system according to this aspect, when the estimated value of the residual quantity of the produced water is greater than the first value and the flow rate of air by the air compressor is not greater than the first flow rate, the controller may maintain the rotational speed of the air compressor unless otherwise the rotational speed of the air compressor needs to be increased according to other conditions. Since the controller maintains the rotational speed of the air compressor unless otherwise the rotational speed of the air compressor needs to be increased according to other conditions if the first condition is not satisfied, the fuel consumption can be sustained.

In the fuel cell system according to this aspect, the controller may estimate a quantity of water inside the fuel cell, or a quantity of water existing in the exhaust system member. The first condition may further include an estimated value of the quantity of water inside the fuel cell, or an estimated value of the quantity of water existing in the exhaust system member being greater than a first value. When the first condition is satisfied, the controller may increase the rotational speed of the air compressor to supply air at or more than the second flow rate that is greater than the first flow rate to the fuel cell, and to discharge water inside the fuel cell. According to this aspect, the drainage can be performed also when water is stored only in one of the fuel cell and the exhaust system member.

In the fuel cell system according to this aspect, the fuel cell system may be mounted on a vehicle. The controller may further determine that the first condition is satisfied when a traveling speed of the vehicle is greater than a first speed. As the rotational speed of the air compressor is increased, operating noise of the air compressor also increases; however, wind noise and road noise are also large when a traveling speed of the vehicle is high or fast. Thus, the controller determines that the first condition is satisfied if the traveling speed of the vehicle is high or fast (e.g., greater than the first speed) in addition to the condition described above. If it meets the condition, since the operating noise of the air compressor is drowned or canceled out by the wind noise and the road noise even if the operating noise of the air compressor etc. becomes large due to the increased rotational speed of the air compressor, there is less influence associated with the increased operating noise of the air compressor.

Note that the present invention may also be implemented in various forms other than those described above. For example, the present invention may be implemented in forms other than the fuel cell system, such as a fuel-cell-mounted vehicle, and a method of controlling the fuel cell.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION OF PREFERRED EMBODIMENTS

First Embodiment

Figure 1:
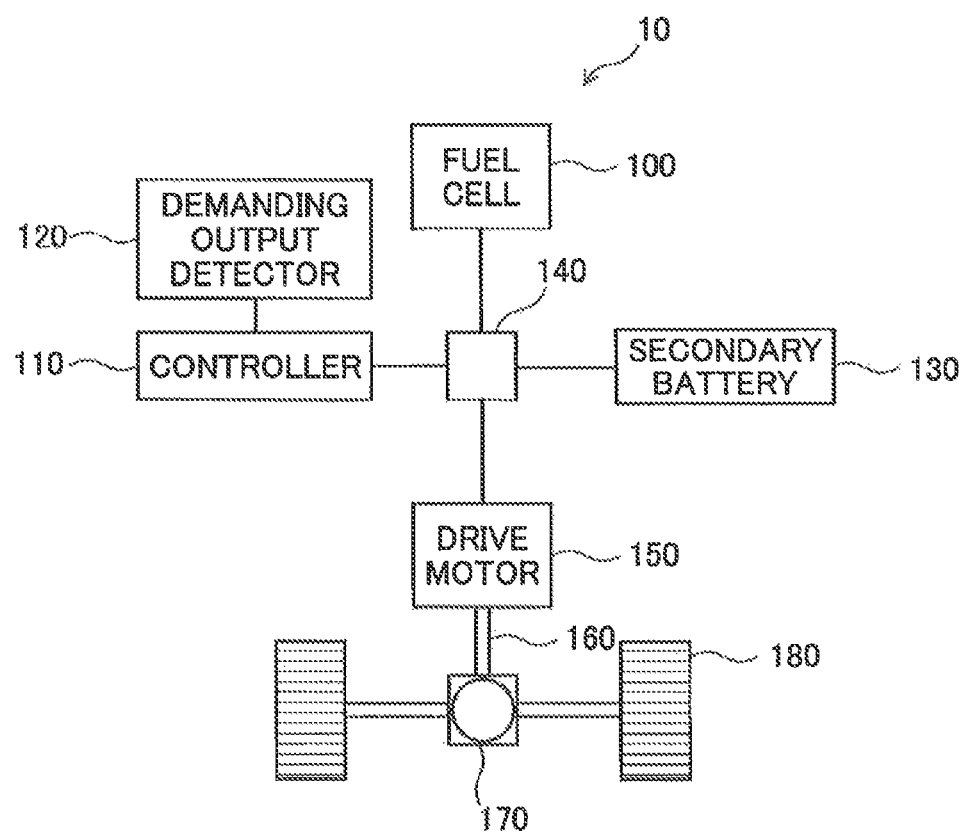
FIG. 1 is a diagram illustrating a vehicle to which a fuel cell is mounted.

FIG. 1 is a diagram illustrating a vehicle to which a fuel cell is mounted. A vehicle 10 includes a fuel cell 100, a controller 110 which is also referred to as an electronic control unit (ECU), a demanding output detector 120, a secondary battery 130, a distribution controller 140, a drive motor 150, a drive shaft 160, a differential 170, and wheels 180.

The fuel cell 100 is a generator that generates electric power by electrochemical reaction between the fuel gas and oxidizing gas. The controller 110 controls electric power outputs from the fuel cell 100 and the secondary battery 130 based on a demanding output value acquired from the demanding output detector 120. The demanding output detector 120 detects a stepping amount of an accelerator pedal (not illustrated) by a vehicle operator, and detects an operator's demanding output based on the stepping amount.

The controller 110 calculates a demanded power production based on the demanding output. The demanded power production is energy to be retrieved from the fuel cell 100. The secondary battery 130 may be a nickel-metal hydride (NiMH) battery or a lithium ion battery, for example. Charge to the secondary battery 130 can be achieved, for example, by charge using power outputted from the fuel cell 100, and/or charge using regenerated power which can be retrieved from a regeneration of kinetic energy of the vehicle 10 when the vehicle 10 decelerates by using the drive motor 150. The distribution controller 140 controls power production retrieved from the fuel cell 100 to the drive motor 150, and power production retrieved from the secondary battery 130 to the drive motor 150, in response to a command from the controller 110. The distribution controller 140 supplies the regenerative power retrieved by the drive motor 150 to the secondary battery 130 in response to a command from the controller 110 when the vehicle 10 decelerates. The drive motor 150 functions as an electric motor for moving or driving the vehicle 10 in response to the supply of electric power. The drive motor 150 functions as a generator for retrieving the kinetic energy of the vehicle 10 as the power production when the vehicle 10 decelerates. The drive shaft 100 is a revolving shaft for transmitting a driving force exerted from the drive motor 150 to the differential 170. The differential 170 distributes the driving force to left and right rear wheels 180.

Figure 2:
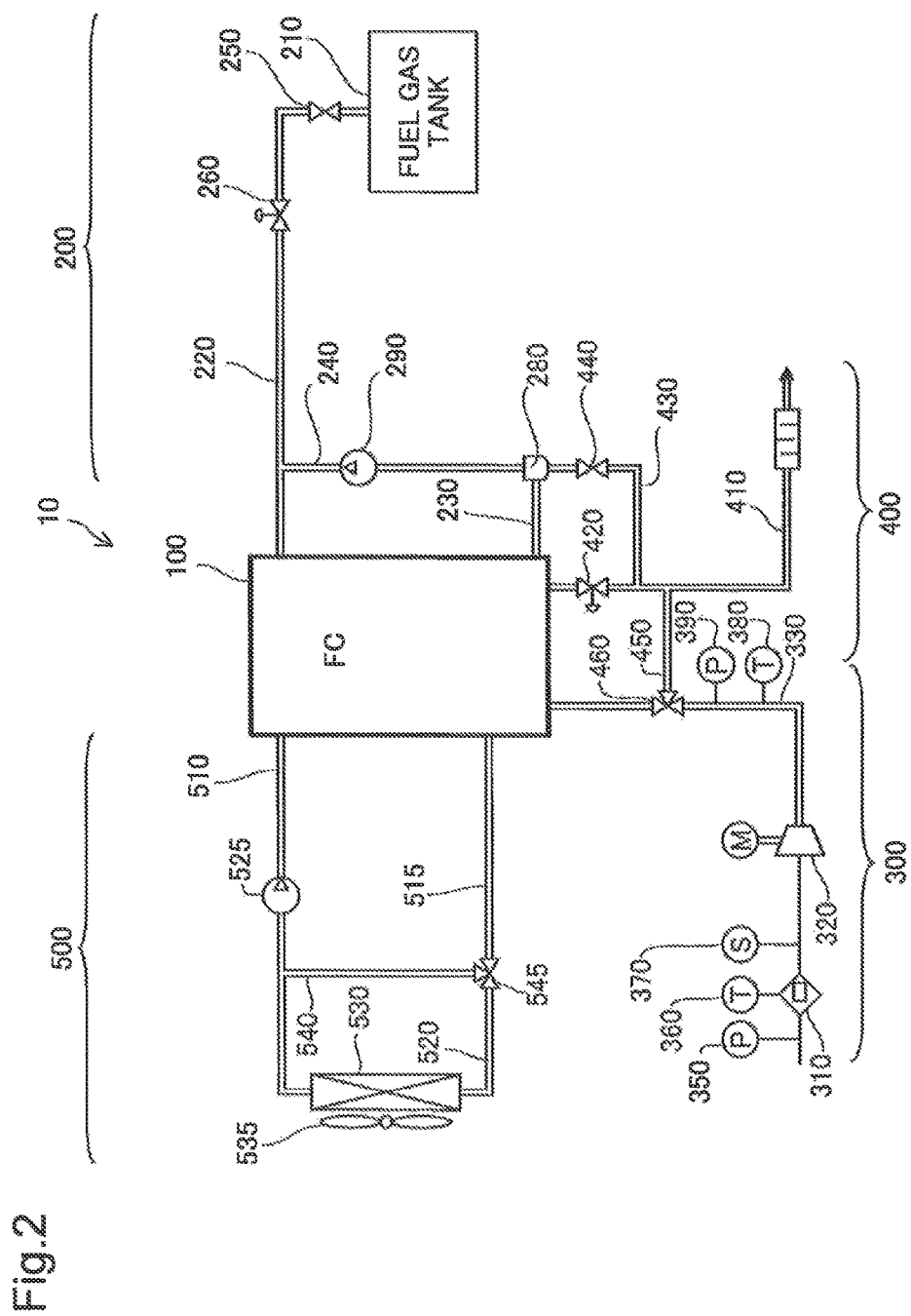
FIG. 2 is a diagram illustrating a fuel cell system of the vehicle.

FIG. 2 is a diagram illustrating a fuel cell system of the vehicle 10. The vehicle 10 also includes a fuel gas supply circuit 200, an oxidizing gas supply circuit 300, an exhaust gas circuit 400, and a cooling circuit 500, in addition to the fuel cell 100.

The fuel gas supply circuit 200 includes a fuel gas tank 210, a fuel gas supply pipe 220, a fuel gas exhaust pipe 230, a fuel gas recirculation pipe 240, a main shutoff valve 250, a regulator 260, a gas liquid separator 280, and a hydrogen pump 290. The fuel gas tank 210 stores the fuel gas. In this embodiment, hydrogen gas is used as the fuel gas. The fuel gas tank 210 is connected with the fuel cell 100 through the fuel gas supply pipe 220. The main shutoff valve 250 and the regulator 260 are provided on the fuel gas supply pipe 220 in this order from the fuel gas tank 210 side. The main shutoff valve 250 allows and stops the supply of the fuel gas from the fuel gas tank 210. The regulator 260 adjusts pressure of the fuel gas supplied to the fuel cell 100 to a predetermined pressure.

The fuel gas exhaust pipe 230 is used in order to discharge fuel exhaust gas from the fuel cell 100. The fuel gas recirculation pipe 240 is connected with the fuel gas exhaust pipe 230 at one end thereof and connected with the fuel gas supply pipe 220 at the other end. The gas liquid separator 280 is provided between the fuel gas exhaust pipe 230 and the fuel gas recirculation pipe 240. The fuel exhaust gas contains hydrogen that was not consumed by the electrochemical reaction, nitrogen that has moved from a cathode, and water that is generated in connection with the electrochemical reaction. The gas liquid separator 280 separates water contained in the fuel exhaust gas from gaseous matters (e.g., hydrogen gas and nitrogen gas). The hydrogen pump 290 is provided on the fuel gas recirculation pipe 240. The fuel cell system supplies the fuel exhaust gas to the fuel cell 100 using the fuel gas recirculation pipe 240 and the hydrogen pump 290 to reuse the hydrogen contained in the fuel exhaust gas for power generation.

The oxidizing gas supply circuit 300 includes an air cleaner 310, an air compressor 320, an oxidizing gas supply pipe 330, an atmospheric pressure sensor 350, an ambient temperature sensor 360, an air flow meter 370, a supply gas temperature sensor 380, and a supply gas pressure sensor 390. The fuel cell 100 of this embodiment uses air (i.e., oxygen contained in air) as the oxidizing gas. The air cleaner 310 removes dust contained in air when inhaling the air. The air compressor 320 compresses the air inhaled through the air cleaner 310, and pumps the compressed air to the fuel cell 100 through the oxidizing gas supply pipe 330. The atmospheric pressure sensor 350 measures atmospheric pressure. The ambient temperature sensor 360 acquires temperature of air before inhaled into the air compressor 320. The air flow meter 370 measures a flow rate of air being inhaled into the air compressor 320. The flow rate is almost equal to an amount of air supplied to the fuel cell 100. Note that the flow rate of air varies according to a rotational speed of the air compressor 320. The supply gas temperature sensor 380 measures temperature of air supplied to the fuel cell 100, and the supply gas pressure sensor 390 measures pressure of the air supplied to the fuel cell 100.

The exhaust gas circuit 400 includes an exhaust gas pipe 410, a back pressure valve 420, a fuel gas discharge pipe 430, an exhaust-and-drain valve 440, an oxidizing gas by-pass pipe 450, and a three-way valve 460. The exhaust, gas circuit 400 corresponds to an exhaust system member cited in the claims. The exhaust gas pipe 410 discharges oxidization exhaust gas (also referred to as "off-gas") of the fuel cell 100. The back pressure valve 420 is provided to the exhaust gas pipe 410. The back pressure valve 420 adjusts pressure of air within the fuel cell 100. The fuel gas discharge pipe 430 connects the gas liquid separator 280 with the exhaust gas pipe 410. The exhaust-and-drain valve 440 is provided to the fuel gas discharge pipe 430. The controller 100 (FIG. 1) causes the exhaust-and-drain valve 440 to open when a nitrogen concentration of the fuel exhaust gas increases or when an amount of water within the gas liquid separator 280 increases to discharge water and gas (mainly, nitrogen). Hydrogen is also discharged at this time. In this embodiment, the fuel gas discharge pipe 430 is connected with the exhaust gas pipe 410 so that hydrogen contained in the discharged gas is diluted by the oxidization exhaust gas. The oxidizing gas by-pass pipe 450 connects the oxidizing gas supply pipe 330 with the exhaust gas pipe 410. The three-way valve 460 is provided to the connecting portion between the oxidizing gas by-pass pipe 450 and the oxidizing gas supply pipe 330.

The cooling circuit 500 includes a cooling water supply pipe 510, a cooling water discharge pipe 515, a radiator pipe 520, a water pump 525, a radiator 530, a by-pass pipe 540, and a three-way valve 545. The cooling water supply pipe 510 is a piping through which cooling water is supplied to the fuel cell 100, and the water pump 525 is provided to the cooling water supply pipe 510. The cooling water discharge pipe 515 is a piping through which the cooling water is discharged from the fuel cell 100. A downstream section of the cooling water discharge pipe 515 is connected with the radiator pipe 520 and the by-pass pipe 540 via the three-way valve 545. The radiator 530 is provided to the radiator pipe 520. A radiator fan 535 is provided to the radiator 530. The radiator fan 535 feeds wind to the radiator 530 to stimulate heat dissipation from the radiator 530. A downstream section of the radiator pipe 520 and a downstream section of the by-pass pipe 540 are connected with the cooling water supply pipe 510. The cooling water is supplied by the water pump 525 to the fuel cell 100 through the cooling water supply pipe 510 to cool the fuel cell 100. The cooling water is warmed while collecting heat from the fuel cell 100. The cooling water is then discharged to the cooling water discharge pipe 515 to be cooled in the radiator 530.

The fuel cell 100 generates electric power by the reaction between hydrogen and oxygen contained in air. The reactions at an anode and the cathode are as follows:

$$H_2O \rightarrow 2H^+ + 2e^- \quad (1)$$

$$(1/2)O_2 + 2H^+ + 2e^- \rightarrow H_2O \quad (2)$$

As illustrated in Equation (2), water is generated at the cathode side. If too much water is stored in the fuel cell 100, flooding will happen, which may reduce a power generation performance of the fuel cell 100. Further, if too much water is stored in the exhaust gas circuit 400 (the exhaust system member), the produced water will be discharged at once at the time of an air blow, and thereby a large quantity of water may be splashed onto a rearward object (e.g., another vehicle traveling rearward of the vehicle 10). Thus, when water more than a predetermined amount is stored in the fuel cell 100, a processing in which the rotational speed of the air compressor 320 is increased to increase the air supply amount so that the stored water is discharged by the air blow is performed. Here, if the rotational speed of the air compressor 320 is increased more than a necessary rotational speed in the normal operation, power consumption will increase, thereby increasing fuel consumption. Therefore, it is desired that the water is discharged outside the fuel cell without increasing the fuel consumption.

Figure 3:
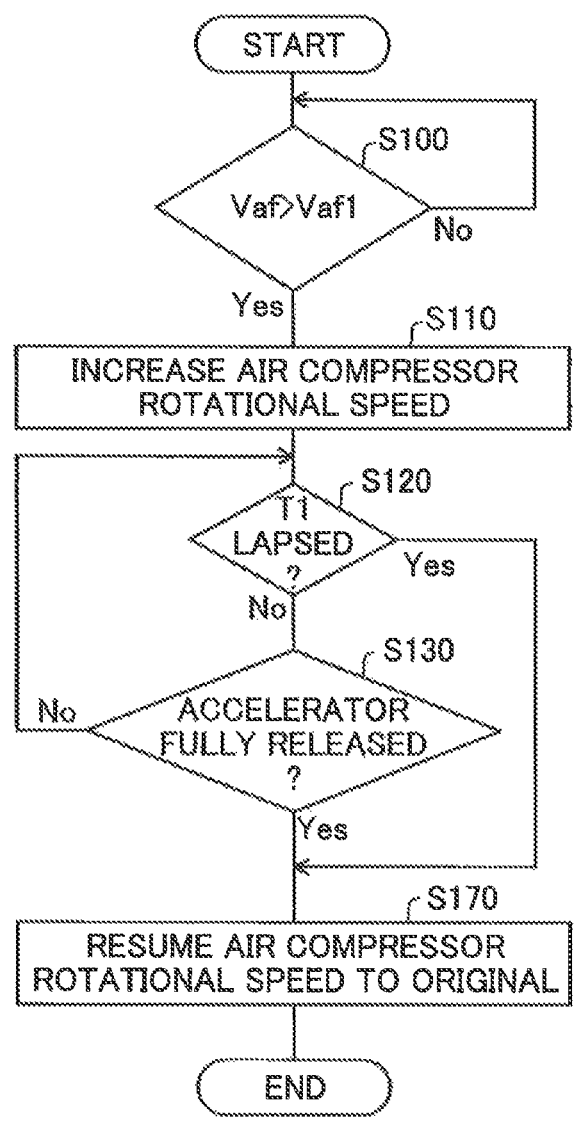
FIG. 3 is a diagram illustrating a control flowchart of drain processing in a first embodiment.

FIG. 3 is a diagram illustrating a control flowchart of the drain processing in the first embodiment. At Step S100, the controller 110 determines whether a flow rate Vaf of air supplied to the fuel cell 100 satisfies a first condition in which the flow rate Vaf is greater than a first flow rate Vaf1 (Vaf>Vaf1), and waits until the first condition is satisfied (Step S100: No). The flow rate Vaf of air supplied to the fuel cell 100 is measurable by the air flow meter 370. If the first condition is satisfied (Step S100: Yes), the controller 110 transits processing to Step S110 where the rotational speed of the air compressor 320 is increased so that air at or more than a second flow rate Vaf2 is supplied to the fuel cell 100. At Step S120, the controller 110 determines whether a predetermined discharge time T1 has lapsed. If the predetermined discharge time T1 has lapsed (Step S120: Yes), the controller 110 transits the processing to Step S170 where the rotational speed of the air compressor 320 is resumed to an original rotational speed before the drain processing. If the predetermined discharge time T1 has not lapsed (Step S120: No), the controller 110 then transits the processing to Step S130 where it is determined whether the accelerator pedal is operated to a fully-closed position by the operator, or the accelerator pedal is fully released. It the accelerator pedal is fully released (Step S130: Yes), the controller 110 transits the processing to Step S170 where the rotational speed of the air compressor 320 is resumed to the original rotational speed before the drain processing. If the accelerator pedal is not fully released (Step S130: No), the controller 110 transits the processing to Step S120. Note that if the accelerator pedal is fully released, a demanded power production to the fuel cell 100 becomes less. For this reason, the controller 110 may use other rotational speeds of the air compressor 320, which can maintain an air flow rate with which the demanded power production to the fuel cell 100 can be satisfied.

Figure 4:
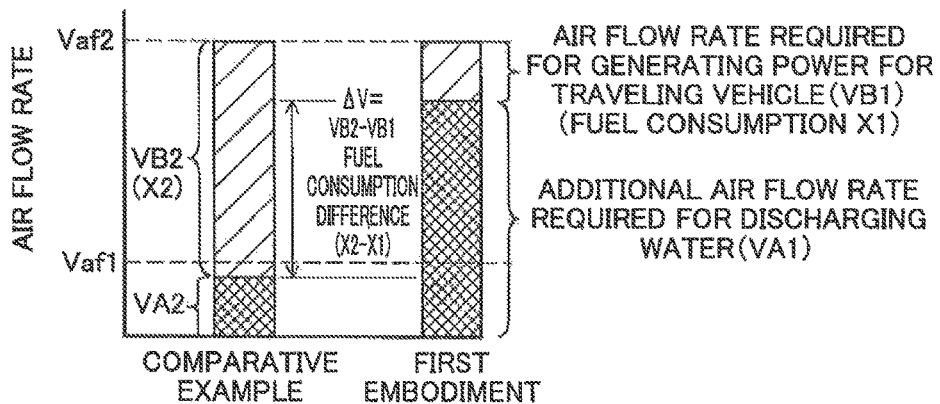
FIG. 4 is a diagram illustrating effects of the first embodiment.

FIG. 4 is a diagram illustrating effects of the first embodiment. In a comparative example, the drain processing is performed at an air flow rate VA2 which is required to generate power for traveling the vehicle 10. The air flow rate VA2 is less than the first flow rate Vaf1. In order to discharge the water from the fuel cell 100, air flow rate at the second flow rate Vaf2 is required. Therefore, in order to discharge the water from the fuel cell 100 and the exhaust gas circuit 400, the controller 110 supplies fuel to the fuel cell 100 at a fuel consumption X2 to cause the fuel cell 100 to generate power required for increasing the rotational speed of the air compressor 320. When the rotational speed of the air compressor 320 is increased, air is supplied to the fuel cell 100 at a flow rate VB2 (=Vaf2−VA2) as an additional quantity of air. Since the additionally-consumed fuel consumption X2 is a fuel quantity used for driving the air compressor 320 in order to discharge the water, but it is not a fuel quantity used for traveling of the vehicle 10, the fuel consumption of the vehicle be increased if the value of fuel consumption X2 is too large. Note that the fuel consumption is an index that is represented by a quantity of fuel required for traveling over a unit distance, or may also be represented by a traveling distance per unit quantity of fuel.

According to the first embodiment, the drain processing is performed under the condition in which an air flow rate VA1 required for generating power for traveling the vehicle 10 is greater than the air flow rate VA2 required for generating power for traveling the vehicle 10 in the case of the comparative example. Therefore, the air flow rate VB1 to be additionally supplied to the fuel cell 100 in order to discharge the water from the fuel cell 100 is less than the VB2 of the comparative example by ΔV (VB2−VB1) as a result. That is, in the first embodiment, the increase in the rotational speed of the air compressor 320 required for supplying the additional quantity of air is suppressed, and the fuel consumption X1 consumed in order to increase the rotational speed of the air compressor 320 (consumed in order to generate power supplied to the air compressor 320) is less than that of the comparative example by (X2−X1). Therefore, the entire fuel consumption of the vehicle can be reduced with respect to the comparative example.

Second Embodiment

Figure 5:
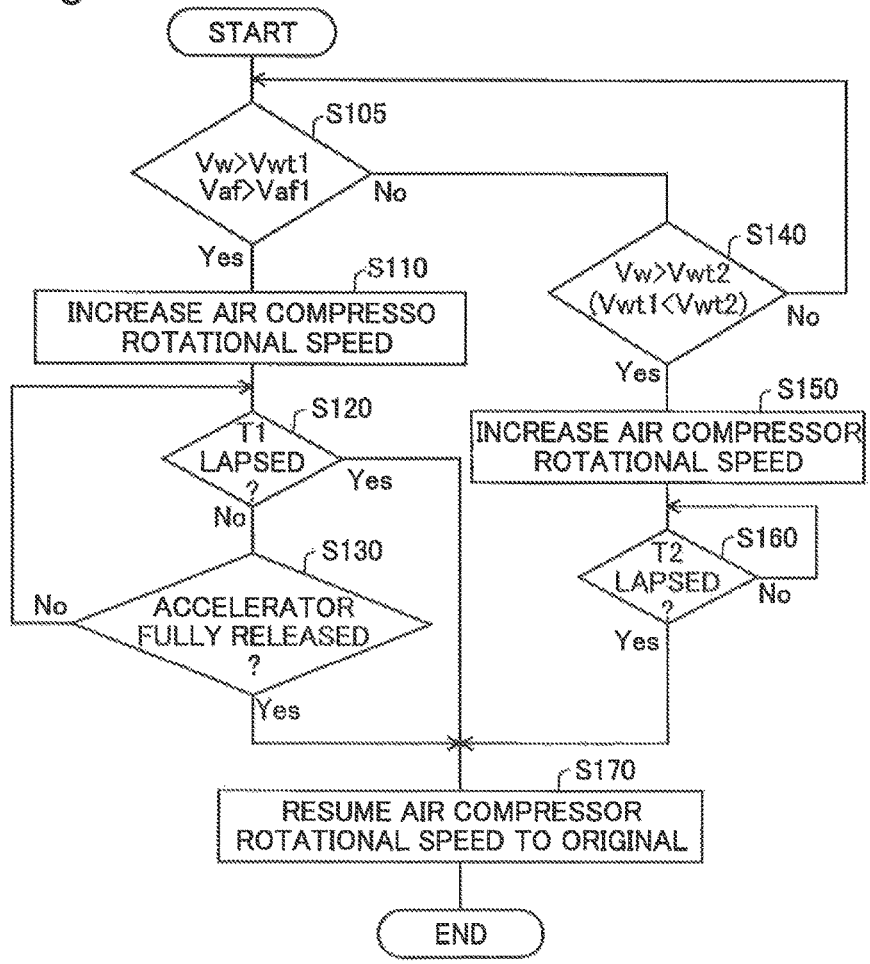
FIG. 5 is a diagram illustrating a control flowchart of drain processing in a fuel cell system in a second embodiment.

FIG. 5 is a diagram illustrating a control flowchart of the drain processing in a second embodiment. At Step S105, the controller 110 determines whether a first condition including the following two conditions is satisfied:

a) An estimated value Vw of a residual quantity of the produced water that is a sum of an estimated value Vw1 of a quantity of water inside the fuel cell 100 and an estimated value Vw2 of a quantity of water which exists in the exhaust gas circuit 400 is greater than a first value Vwt1 (i.e., Vw>Vwt1); and b) A flow rate Vaf of air supplied to the fuel cell 100 is greater than the first flow rate Vaf1 (i.e., Vaf>Vaf1).

The estimated value Vw1 of the quantity of water inside the fuel cell 100 can be estimated based on a quantity of water produced in association with the power generation by the fuel cell 100, a quantity of water discharged from the fuel cell 100 in normal operation, and a quantity of water discharged by the last air blow from the fuel cell 100. Since the quantity of water produced in association with the power generation by the fuel cell 100 is proportional to the power production of the fuel cell 100, it is easily to be calculated based on the power production. The estimated value Vw1 of the quantity of water inside the fuel cell 100 may be estimated using a method disclosed in Japanese Patent Publication (JP 2011-090886A), the contents of all of which are incorporated herein by reference in their entirety. The estimated value Vw2 of the quantity of water that exists in the exhaust gas circuit 400 can be estimated based on the quantity of water discharged from the fuel cell 100, a quantity of water discharged from the exhaust gas circuit 400 in the normal operation, and a quantity of water discharged by the last air blow from the exhaust gas circuit 400. The flow rate Vaf of air supplied to the fuel cell 100 is measurable by the air flow meter 370.

At Step S105, when the two conditions described above are met (Step S105: Yes), the controller 110 transits processing to Step S110 where the rotational speed of the air compressor 320 is increased so that air at or more than the second flow rate Vaf2 is supplied to the fuel cell 100. Note that the controller 110 may define the rotational speed of the air compressor 320 (or the flow rate of air supplied to the fuel cell 100) according to the estimated value Vw of the residual quantity of the produced water. Since processings at Steps S120, S130 and S170 are the same as those of the first embodiment, explanation thereof is omitted in this embodiment.

At Step S105, if either one of the two conditions described above is not met (Step S105: No), the controller 110 transits the processing to Step S140 where the controller 110 determines whether the estimated value Vw of the residual quantity of the produced water is greater than a second value Vwt2. The second value Vwt2 is a greater value than the first value Vwt1. At Step S140, if the estimated value Vw of the residual quantity of the produced water is greater than the second value Vwt2 (i.e., Vw>Vwt2) (Step S140: Yes), the controller 110 transits the processing to Step S150 where the rotational speed of the air compressor 320 is increased so that air at or more than the second flow rate Vaf2 is supplied to the fuel cell 100. Note that at Step S140 if (Vw>Vwt2) is met, (Vw>Vwt1) at Step S105 also has been met, it can be considered that the air flow rate Vaf is smaller than the first flow rate Vaf1, and water is stored in a state where the water discharge at Step S110 cannot be performed.

At Step S160, the controller 110 determines whether a predetermined discharge time T2 has lapsed. The discharge time T2 is a value longer than the discharge time T1. Note that the discharge time T2 at Step S160 may be the same length as the discharge time T1 at Step S120, and the rotational speed of the air compressor 320 at Step S150 may be greater or faster than the rotational speed of the air compressor 320 at Step S110. The controller 110 waits until the predetermined discharge time T2 has lapsed (Step S160: No), and if the predetermined discharge time T2 has lapsed (Step S160: Yes), the controller 110 transits the processing to Step S170 where the rotational speed of the air compressor 320 is resumed to the original state before the drain processing.

At Step S140, if the estimated value Vw of the residual quantity of the produced water is not greater than the second value Vwt2 (Vw≤Vwt2) (Step S140: No), the controller 110 transits the processing to Step S105. The controller 110 maintains the rotational speed of the air compressor 320 in this case, unless otherwise the rotational speed of the air compressor 320 needs to be increased according to other conditions, such as when the accelerator pedal is stepped on by the operator.

As described above, according to the second embodiment, if the estimated value Vw of the residual quantity of the produced water is greater than the first value Vwt1 and the air flow rate Vaf by the air compressor 320 is greater than the first flow rate Vaf1, the controller 110 increases the rotational speed of the air compressor 320 to supply air to the fuel cell 100 at the second flow rate Vaf2 which is greater than the first flow rate Vaf1, and discharge the water inside the fuel cell 100 and the exhaust gas circuit 400. Therefore, similar to the first embodiment, the air quantity ΔV to be additionally supplied to the fuel cell 100 can be less as a result, and the fuel consumption can be less than the case where the water inside the fuel cell 100 and the exhaust gas circuit 400 is discharged under the condition in which the air flow rate Vaf by the air compressor 320 is not greater than the first flow rate Vaf1.

Modifications

Figure 6:
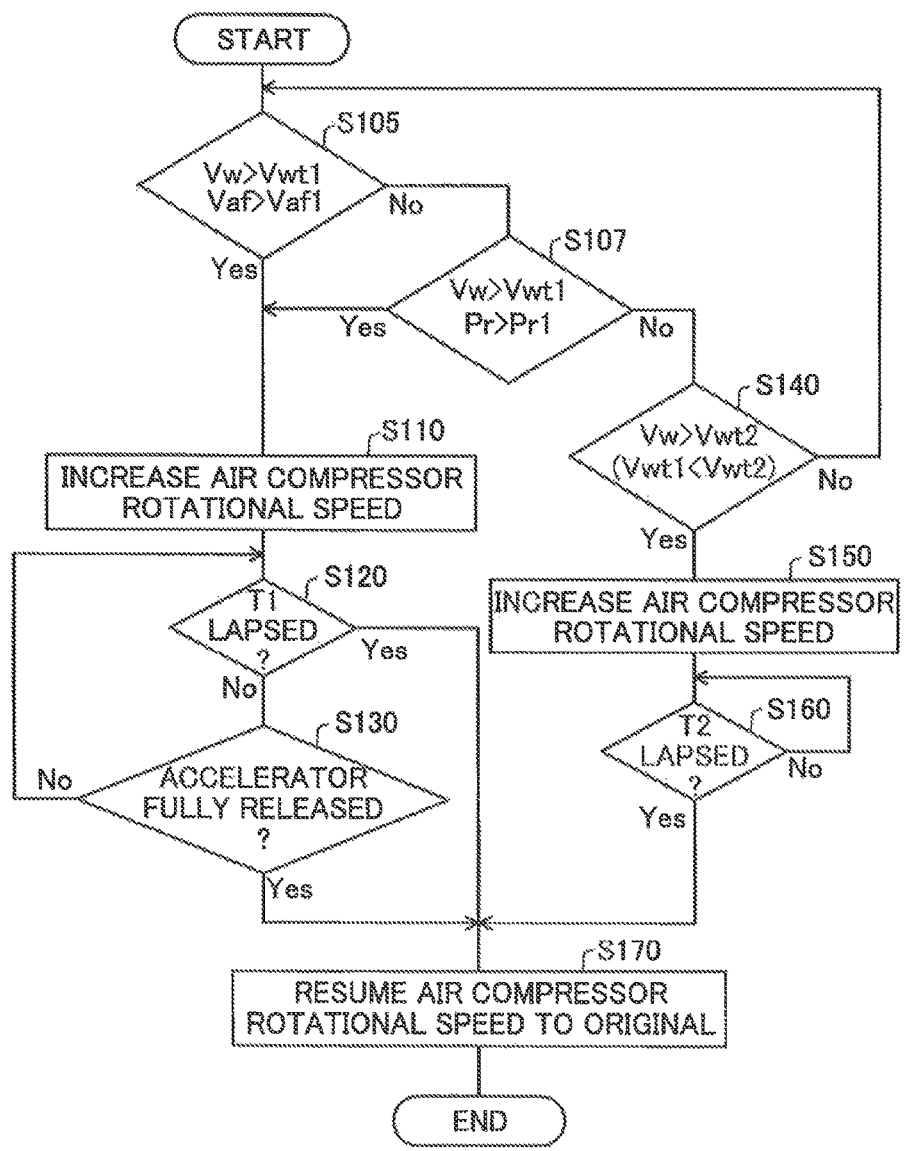
FIG. 6 is a diagram illustrating a first modification of the present invention.

FIG. 6 is a diagram illustrating a first modification of the present invention. This modification has Step S107 in addition to the flowchart of the second embodiment illustrated in FIG. 5. At Step S105, if the first condition is not satisfied, the controller 110 then determines whether the following second condition is satisfied at Step S107:

a) The estimated value Vw of the residual quantity of the produced water is greater than the first value Vwt1 (Vw>Vwt1); and c) A power production (Pr) demanded to the fuel cell 100 is greater than a first power production (Pr1).

As described above, the controller 110 can calculate the power production demanded to the fuel cell 100 (the demanded power production) based on the stepping amount of the accelerator pedal of the vehicle. If the second condition is satisfied, the controller 110 transits processing to Step S110, and, on the other hand, if not satisfied, the controller 110 transits processing to Step S140. The subsequent processings are the same as those of the second embodiment. As the demanded power production increases, the power production of the fuel cell 100 increases, and thereby increasing the air flow rate for generating the demanded power production. As the result, since the flow rate of air supplied in addition to the flow rate for generating the demanded power production is decreased, the fuel consumption can similarly be lowered. Note that in this modification, although the controller 110 performs Step S107 if the condition at Step S105 is not satisfied, the controller 110 may perform S107 without performing Step S105. That is, the controller 110 does not determine the satisfaction of the first condition but it determines based on the second condition whether the rotational speed of the air compressor 320 is to be increased.

Figure 7:
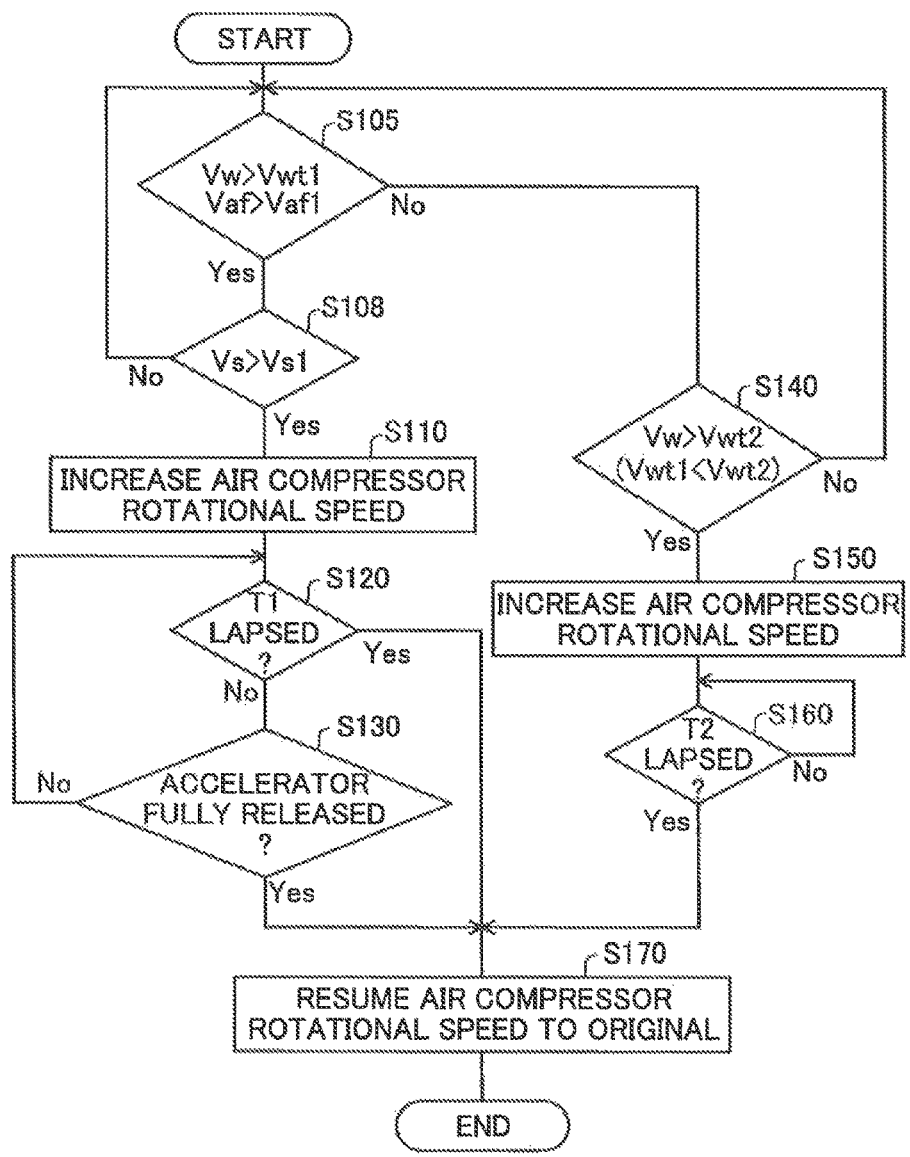
FIG. 7 is a diagram illustrating a second modification of the present invention.

FIG. 7 is a diagram illustrating a second modification of the present invention. This modification has Step S108 in addition to the flowchart of the second embodiment illustrated in FIG. 5. At Step S105, if the first, condition is satisfied, the controller 110 then transits the processing to Step S108. At Step S108, the controller 110 determines whether the following condition is satisfied:

d) A traveling speed Vs of the vehicle 10 is greater than a first traveling speed Vs1.

The traveling speed Vs of the vehicle 10 can be calculated based on a rotational speed of the drive shaft 160 which is driven by the drive motor 150. If the traveling speed Vs of the vehicle 10 is greater than the first traveling speed Vs1 (Step S108: Yes), the controller 110 transits the processing to Step S110, and, on the other hand, if not (Step S108: No), the controller 110 returns the processing to Step S105. Here, as the rotational speed of the air compressor 320 increases, operating noise of the air compressor 320 also increases. However, if the traveling speed Vs of the vehicle 10 is greater than the first traveling speed Vs1, wind noise and road noise are also large. As the result, the increased operating noise of the air compressor is drowned or canceled out by the wind noise and the road noise, and therefore it becomes hard to be heard in the cabin. For this reason, the first condition is configured to be satisfied in this modification if the traveling speed Vs of the vehicle 10 is greater or faster than the first traveling speed Vs1.

In the second embodiment and the modifications described above, the controller 110 performs determinations including the determination of whether the estimated value Vw of the residual quantity of the produced water is greater than the first value Vwt1 as the first condition, and determinations including the determination of whether the estimated value Vw of the residual quantity of the produced water is greater than the second value Vwt2 as the second condition. The controller 110 may determine whether at least one of the estimated value Vw1 of the quantity of water inside the fuel cell 100 and the estimated value Vw2 of the quantity of water which exists in the exhaust gas circuit 400 is greater than a third value Vwt3 as the first condition. Note that the third value Vwt3 may be less than the first value Vwt1. In this case, if too much water is stored in either one of the fuel cell 100 and the exhaust gas circuit 400, it can be drained by performing the air blow. Further, the controller 100 may determine the quantity of water as the first condition only based on the estimated value Vw1 of the quantity of water inside the fuel cell 100, or may be determined only based on the estimated value Vw2 of the quantity of water in the exhaust gas circuit 400. If determining only based on the estimated value Vw1 of the quantity of water inside the fuel cell 100, the reduction in the power generation performance of the fuel cell 100 due to flooding can be suppressed. If determining only based on the estimated value Vw2 of the quantity of water of the exhaust gas circuit 400 (the exhaust system member), it can be reduced that the large quantity of water is splashed onto a rearward object (e.g., another vehicle traveling rearward of the vehicle 10).

As described above, although the embodiments of the present invention are described based on several examples, the embodiments of the invention described above are intended to facilitate understanding of the invention but not to limit the invention. The present invention may be changed and improved without departing from the scope of the invention and the appended claims, and of course include equivalents of the invention.

What is claimed is:

1. A fuel cell system, comprising: a fuel cell configured to generate power by a reaction of fuel gas and air; an air compressor configured to supply air to the fuel cell; a controller programmed to control operations of the fuel cell and the air compressor; and an exhaust system member configured to discharge off-gas and produced water from the fuel cell, wherein when a first condition including a flow rate of air supplied to the fuel cell by the air compressor being greater than a first flow rate is satisfied, the controller increases a rotational speed of the air compressor to supply air at or more than a second flow rate that is greater than the first flow rate to the fuel cell, and to discharge water inside the fuel cell.

2. The fuel cell system in accordance with claim 1, wherein, the controller is programmed to estimate a residual quantity of the produced water that is a sum of a quantity of water inside the fuel cell and a quantity of water existing in the exhaust system member, the first condition further includes an estimated value of the residual quantity of the produced water being greater than a first value, and when the first condition is satisfied, the controller is programmed to increase the rotational speed of the air compressor to supply air at or more than the second flow rate that is greater than the first flow rate to the fuel cell, and to discharge water inside the fuel cell.

3. The fuel cell system in accordance with claim 2, wherein, when a second condition, including the estimated value of the residual quantity of the produced water being greater than the first value, and a demanded power production of the fuel cell being greater than a first power production, is satisfied, the controller increases the rotational speed of the air compressor to supply air at or more than the second flow rate to the fuel cell, and to discharge water inside the fuel cell, regardless of whether or not the first condition is satisfied.

4. The fuel cell system in accordance with claim 2, wherein, when the estimated value of the residual quantity of the produced water is greater than a second value that is greater than the first value, the controller is programmed to increase the rotational speed of the air compressor to supply air at or more than the second flow rate to the fuel cell, and to discharge water inside the fuel cell regardless of whether or not the first condition is satisfied.

5. The fuel cell system in accordance with claim 2, wherein, when the estimated value of the residual quantity of the produced water is greater than the first value and the flow rate of air by the air compressor is not greater than the first flow rate, the controller maintains the rotational speed of the air compressor unless otherwise the rotational speed of the air compressor needs to be increased according to other conditions.

6. The fuel cell system in accordance with claim 1, wherein, the controller estimates a quantity of water inside the fuel cell, or a quantity of water existing in the exhaust system member, the first condition further includes an estimated value of the quantity of water inside the fuel cell, or an estimated value of the quantity of water existing in the exhaust system member being greater than to first value, and when the first condition is satisfied, the controller increases the rotational speed of the air compressor to supply air at or more than the second flow rate that is greater than the first flow rate to the fuel cell, and to discharge water inside the fuel cell.

7. The fuel cell system in accordance with claim 1, wherein, the fuel cell system is mounted on a vehicle, and the controller further determines that the first condition is satisfied when a traveling speed of the vehicle is greater than a first speed.

* * * * *